United States Patent [19]

Bootz et al.

[11] Patent Number: 5,391,716
[45] Date of Patent: Feb. 21, 1995

[54] MONOAZO 2-HYDROXY-PYRIDONE-CONTAINING REACTIVE DYESTUFFS

[75] Inventors: Konrad Bootz, Wetter; Hermann Henk, Köln, both of Germany

[73] Assignee: Bayer Aktiengesellschaft, Leverkusen, Germany

[21] Appl. No.: 57,228

[22] Filed: May 4, 1993

[30] Foreign Application Priority Data

May 8, 1992 [DE] Germany .............. 4215207

[51] Int. Cl.$^6$ ............ C09B 62/085; D06P 1/382
[52] U.S. Cl. .................. 534/635; 534/632
[58] Field of Search ........................ 534/635

[56] References Cited

U.S. PATENT DOCUMENTS

| | | | |
|---|---|---|---|
| 3,668,211 | 6/1972 | Crabtree | 546/288 |
| 3,847,894 | 11/1974 | Ridyard | 534/635 |
| 3,905,950 | 9/1975 | Crabtree | 534/634 X |
| 3,926,944 | 12/1975 | Berrie et al. | 534/634 |
| 3,936,436 | 2/1976 | Berrie et al. | 534/635 |
| 3,994,906 | 11/1976 | Hegar | 534/635 X |
| 4,039,523 | 8/1977 | Hegar | 534/635 |

FOREIGN PATENT DOCUMENTS

| | | | |
|---|---|---|---|
| 224155 | 6/1987 | European Pat. Off. | 534/635 |
| 316778 | 5/1989 | European Pat. Off. | 534/635 |
| 1271226 | 4/1972 | United Kingdom | 534/635 |

*Primary Examiner*—Mary C. Lee
*Assistant Examiner*—Fiona T. Powers
*Attorney, Agent, or Firm*—Sprung Horn Kramer & Woods

[57] ABSTRACT

Monoazo reactive dyestuffs of the formula

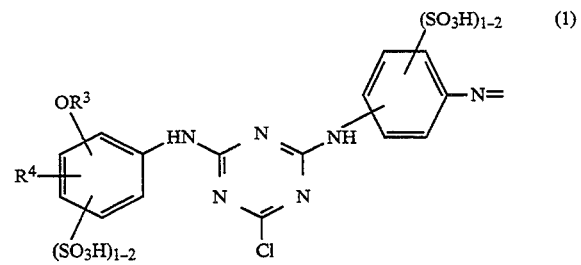

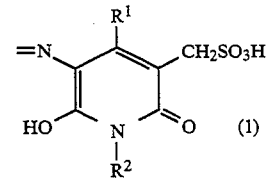

wherein the substituents have the meaning given in the description, are particularly suitable for dyeing materials containing OH groups or amide groups.

6 Claims, No Drawings

MONOAZO 2-HYDROXY-PYRIDONE-CONTAINING REACTIVE DYESTUFFS

The present invention relates to monoazo reactive dyestuffs, their preparation and their use.

Monoazo reactive dyestuffs are known from an extensive prior art, reference being made to, for example, DE-A-2,162,612, DE-A-2,221,064 and U.S. Pat. No. 3,926,944. However, the known monoazo reactive dyestuffs still have disadvantages in respect of use and fastness properties.

The present invention relates to monoazo reactive dyestuffs which, in the form of the free acid, correspond to structure (1)

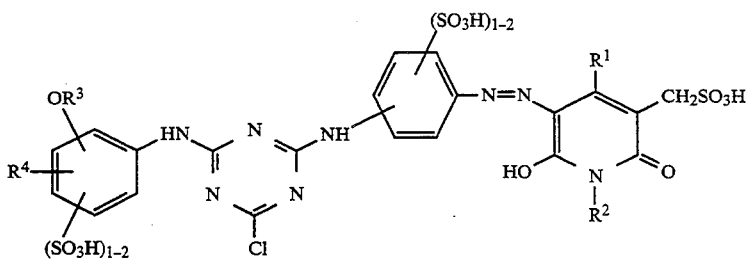

(1)

wherein
$R^1$ = H, $CH_3$, $CO_2H$, $CH_2SO_3H$, $C_6H_5$,

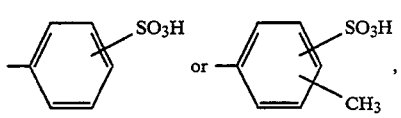

$R^2$ = H, $CH_3$, $C_2H_5$, $CH_2CH_2SO_3H$, $CH_2CH_2OSO_3H$,

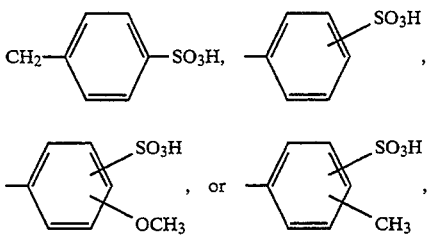

$R^3$ = $C_1$-$C_6$-alkyl or aryl, which can optionally be substituted; suitable substituents are OH, $C_1$-$C_4$-alkoxy, halogen, carboxyl or sulpho, and
$R^4$ = H, $C_1$-$C_6$-alkyl or $OR^3$.

Dyestuffs which are to be singled out are those of structure (2)

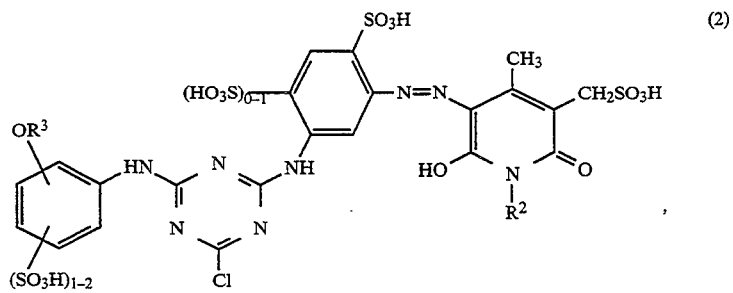

(2)

wherein
$R^2$ = H, $CH_3$ or $C_2H_5$ and
$R^3$ = $C_1$-$C_6$-alkyl,
and dyestuffs of structure (3)

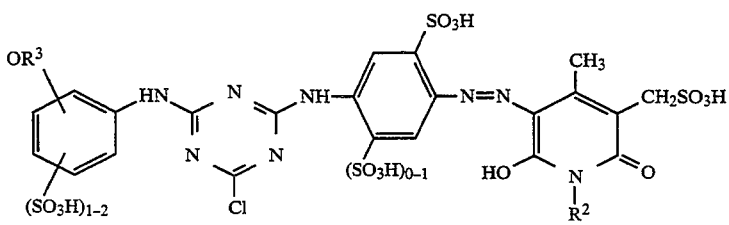

wherein
$R^2$ = H, $CH_3$ or $C_2H_5$ and
$R^3$ = $C_1$-$C_6$-alkyl.

Preferred dyestuffs are those of structure (4)

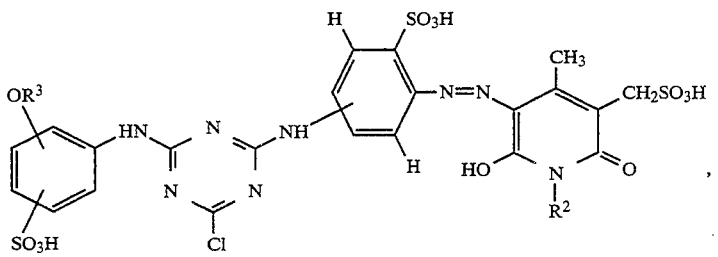

(4)

wherein
R² = H, CH₃ or C₂H₅ and
R³ = C₁–C₆-alkyl.

Particularly preferred dyestuffs are those of structure (5)

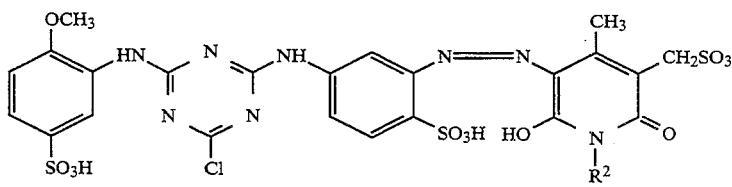

where
R² = H, CH₃ or C₂H₅.

The invention also relates to the process for the preparation of the reactive dyestuffs of structure (1) by a procedure in which, for example, a) aminoazo dyestuffs of structure (6)

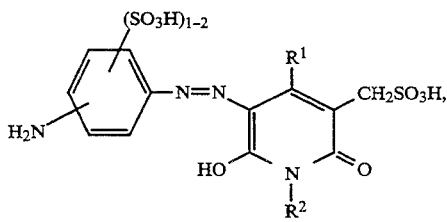

are subjected to a condensation reaction with cyanuric chloride and then with amino-alkoxy (or phenoxy)-benzenemono- or -disulphonic acids (6a)

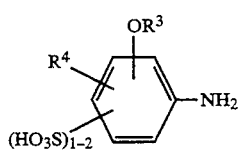

in the presence of acid-binding agents,
wherein
R¹, R², R³ and R⁴ have the abovementioned meaning, or b) aminoazo dyestuffs of structure (6) are subjected to a condensation reaction with the monocondensation product (6b) from cyanuric chloride and amino-alkoxy(or phenoxy)benzenemono- or -disulphonic acid in the presence of acid-binding agents

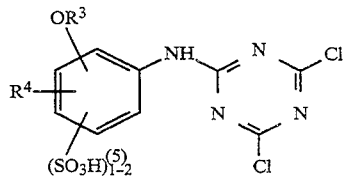

wherein
R¹, R², R³ and R⁴ have the abovementioned meaning, or c) the condensation product (6c) from diaminobenzenemono- or -disulphonic acid, cyanuric chloride and amino-alkoxy(or phenoxy)benzenemono- or -disulphonic acid is diazotised in the customary manner

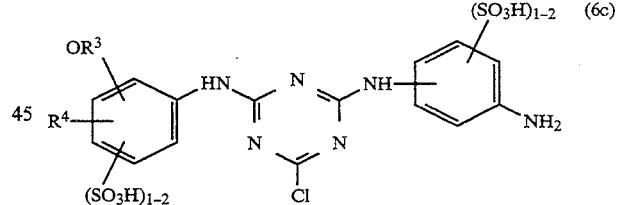

and the diazotisation product is coupled to pyridones having the structure (7) or (8)

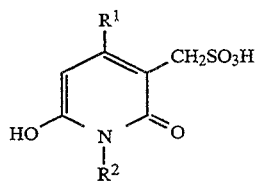

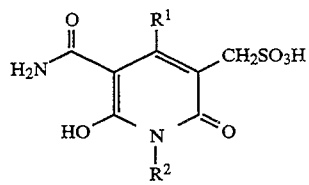

such as are described, for example, in DE-A-2,162,858,
wherein
R¹, R², R³ and R⁴ have the abovementioned meaning.

The aminoazo compounds of structure (6) are obtained by coupling diazotised acylamino-aminobenzenemono- or -disulphonic acids to pyridones of structure (7) and (8) and subsequent hydrolysis of the resulting acylaminoazo compounds.

Selected examples of substituted aminobenzenesulphonic acids of structure (6a) are, inter alia:
5-amino-2-methoxybenzenesulphonic acid,
5-amino-2-ethoxybenzenesulphonic acid,
3-amino-4-methoxybenzenesulphonic acid,
3-amino-4-phenoxybenzenesulphonic acid,
2-amino-5-methoxybenzenesulphonic acid,
2-amino-5-methoxybenzene-1,4-disulphonic acid,
5-amino-2-phenoxybenzenesulphonic acid,
4-amino-5-methoxy-2-methylbenzenesulphonic acid
and
3-amino-4-methoxy-6-methylbenzenesulphonic acid.

The formulae shown are those of the free acids. The salts, in particular the alkali metal salts, such as sodium, potassium or lithium salts, are in general obtained during the preparation.

The dyestuffs can also be employed as concentrated solutions.

The dyestuffs according to the invention are outstandingly suitable for dyeing and printing naturally occurring and synthetic materials containing OH groups or amide groups, in particular those of cellulose and polyamides. They are particularly suitable for dyeing cellulose materials by the exhaustion and cold pad-batch dyeing process, and for printing cotton and viscose staple.

Dyeings having good general fastness properties, in particular wet fastness properties, are obtained with high fixing yields.

EXAMPLE 1 a) 33.4 g of 4-acetamino-2-aminobenzenesulphonic acid are diazotised with sodium nitrite solution under acid conditions in a known manner. 39.5 g of 3-aminocarbonyl-1,4-dimethyl-5-sulphomethyl-6-hydroxy-2-pyridone are added to the finished diazonium salt suspension, and the pH of the reaction mixture is slowly brought to pH 7.5 with 20% strength sodium carbonate solution and kept constant. After 30 minutes, the coupling has ended.

The dyestuff mixture (volume about 700 ml) is now rendered acid with 100 ml of concentrated hydrochloric acid and heated to 95°–98° C. for 1 hour. A deep yellow solution briefly results. Towards the end of the hydrolysis, the aminoazo compound precipitates in crystalline form. The mixture is cooled to room temperature and, after addition of 40 g of sodium chloride, the product is filtered off with suction.

The moist yellow paste is stirred in 400 ml of water and dissolved at pH 6.5 with lithium hydroxide solution. This solution is introduced into an initial mixture of 150 g of ice, 1 drop of emulsifier and 26.7 g of cyanuric chloride, the pH being kept constant at between 5.5 and 6.0 by addition of 2N sodium hydroxide solution. After a subsequent stirring time of 45 minutes, the mixture is clarified to remove unreacted cyanuric chloride. 29.4 g of 3-amino-4-methoxybenzenesulphonic acid, dissolved as a neutral solution in 130 ml of water, are allowed to run into this first condensation mixture, and the mixture is heated to 40° C. The acylation reaction is kept at pH 6.5–7.0 by metering in 2N sodium hydroxide solution. When no further change in pH is to be observed, 150 g of sodium chloride are added, and the product is isolated and dried at 40° C. in vacuo. 125 g of a salt-containing dyestuff powder which dyes cotton in a brilliant greenish-tinged yellow shade and has the following structure, in the form of the free acid, are obtained ($\lambda_{max}$(H₂O)=422 nm).

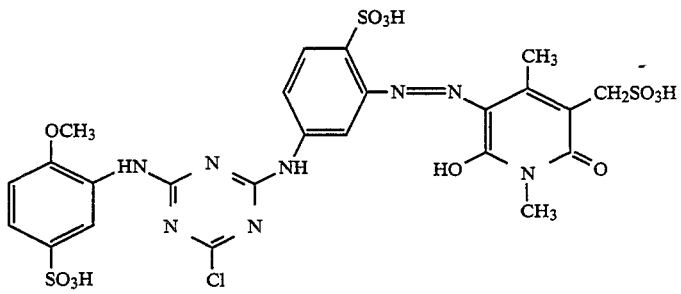

The same dyestuff can be prepared by the following alternative routes:

b) 29.4 g of 3-amino-4-methoxybenzenesulphonic acid are dissolved in 260 ml of water to give a neutral solution, and the solution is added to a suspension of 27.0 g of cyanuric chloride, 1 drop of emulsifier and 250 g of ice, the pH being kept constant at 4.5–5.5 by metering in 2N sodium hydroxide solution. When the acylation has ended, the mixture is clarified to remove unused cyanuric chloride, and is added dropwise to the solution, described in Example 1a, of the colour base. The condensation reaction is carried out at 40° C. and pH 6.5–7.0. The finished dyestuff can be isolated by salting out or spray drying.

c) 29.4 g of 3-amino-4-methoxybenzenesulphonic acid are dissolved in 130 ml of water to give a neutral solution, and the solution is added to a suspension of 26.8 g of cyanuric chloride, 1 drop of emulsifier and 150 g of ice, the pH being kept constant at 4.5–5.5 by metering in 2N sodium hydroxide solution. When the acylation has ended, 27.2 g of 2,4-diaminobenzenesulphonic acid, dissolved in 120 ml of water to give a neutral solution, are allowed to run in and the mixture is heated to 40° C. The pH is kept at 6–7 during this condensation reaction by addition of 2N sodium hydroxide solution.

To bring the reaction to completion, the mixture is subsequently stirred at 40° C. for 1 hour, and is then clarified. 6.9 g of sodium nitrite (solid) and 40 g of sodium chloride are added to this solution, and the mixture is allowed to run into an initial mixture of 150 g of ice and 40 ml of concentrated hydrochloric acid. The mixture is subsequently stirred for 15 minutes and the excess nitrite is removed with amidosulphonic acid.

39.5 g of 3-aminocarbonyl-1,4-dimethyl-5-sulphomethyl-6-hydroxy-2-pyridone (solid) are added to this suspension, and the pH is brought slowly to 6.7–7.0 with 2N sodium hydroxide solution and kept constant. After 30 minutes, the coupling has ended. The yellow dyestuff is isolated by spray drying.

d) The diazo component used in Example 1c) can also be prepared by subjecting cyanuric chloride to a condensation reaction first with 2,4-diaminobenzenesulphonic acid, and with 3-amino-4-methoxybenzenesulphonic acid only in a second stage. The diazotisation and coupling are then carried out as in Example 1c).

Dyestuffs which are likewise valuable are obtained by using comparable amino-alkoxy (or phenoxy) benzenemono- or -disulphonic acids (compare structure 6a) or alternative phenylenediamine components.

EXAMPLE 2

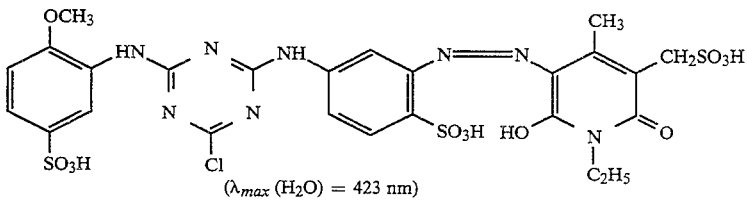

($\lambda_{max}$ (H$_2$O) = 423 nm)

EXAMPLE 3

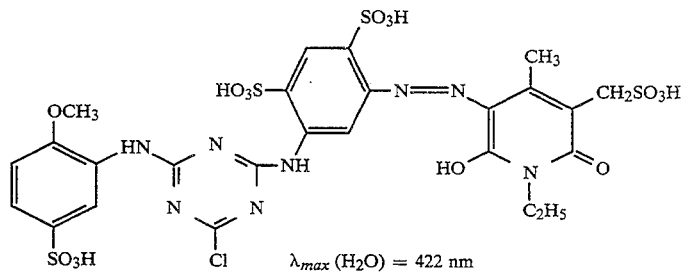

$\lambda_{max}$ (H$_2$O) = 422 nm

EXAMPLE 4

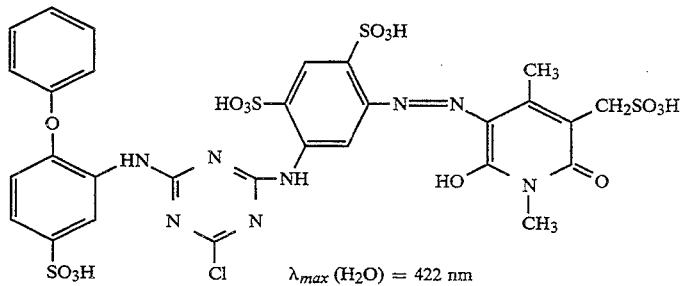

$\lambda_{max}$ (H$_2$O) = 422 nm

EXAMPLE 5

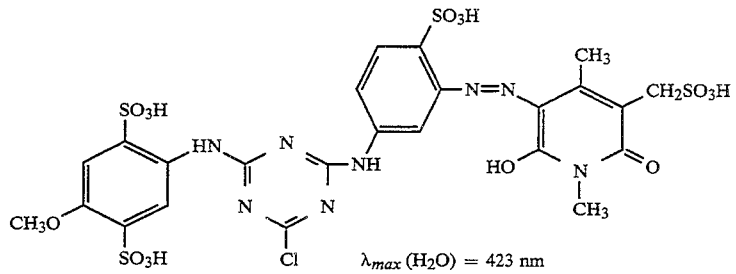

$\lambda_{max}$ (H$_2$O) = 423 nm

EXAMPLE 6

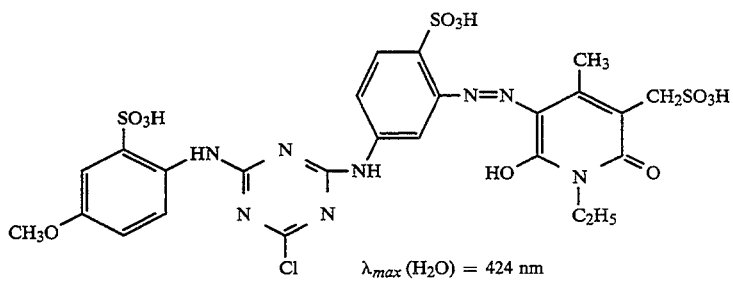

$\lambda_{max}$ (H$_2$O) = 424 nm

EXAMPLE 7

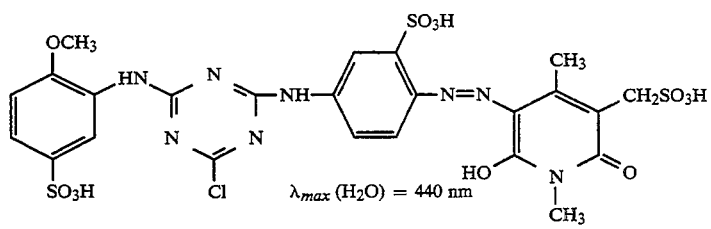

$\lambda_{max}$ (H$_2$O) = 440 nm

EXAMPLE 8

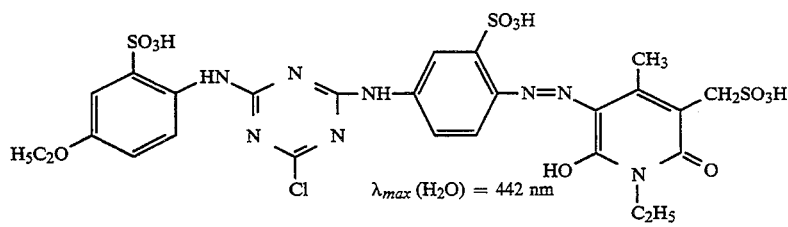

$\lambda_{max}$ (H$_2$O) = 442 nm

We claim:
1. Monoazo reactive dyestuff which, in the form of the free acid, corresponds to the structure

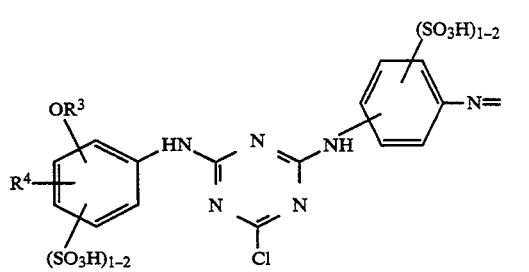

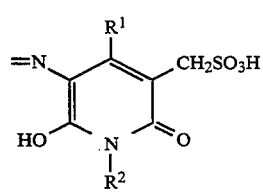

wherein
R$^1$ = H, CH$_3$, CO$_2$H, CH$_2$SO$_3$H, C$_6$H$_5$,

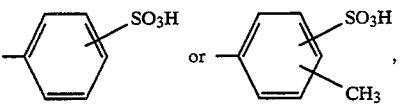

R$^2$ = H, CH$_3$, C$_2$H$_5$, CH$_2$CH$_2$SO$_3$H, CH$_2$CH$_2$OSO$_3$H,

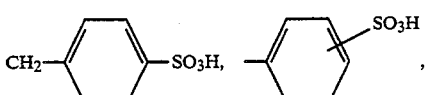

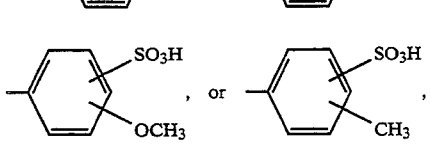

R$^3$ = C$_1$–C$_6$-alkyl or aryl, which are unsubstituted or substituted by OH, C$_1$–C$_4$-alkoxy, halogen, carboxyl or sulpho, and
R$^4$ = H, C$_1$–C$_6$-alkyl or OR$^3$.
2. Dyestuff according to claim 1, of the structure

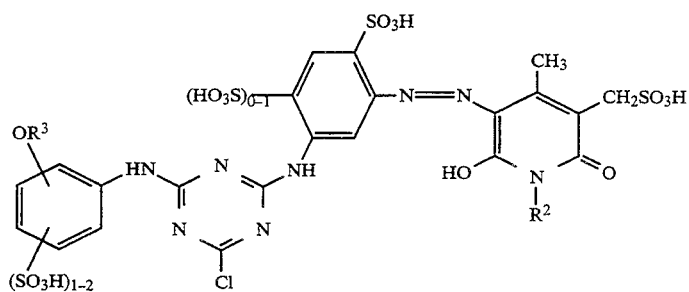

wherein
R[2]=H, CH$_3$ or C$_2$H$_5$ and
R[3]=C$_1$–C$_6$-alkyl.

3. Dyestuff according to claim 1, of the structure

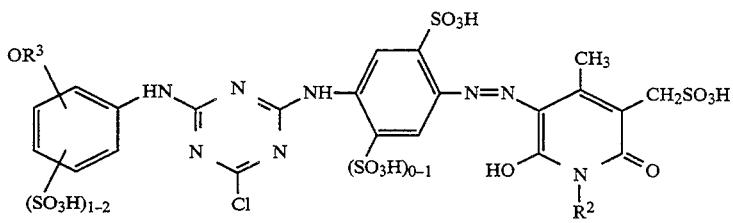

wherein
R[2]=H, CH$_3$ or C$_2$H$_5$ and
R[3]=C$_1$–C$_6$-alkyl.

4. Dyestuff according to claim 1, of the structure

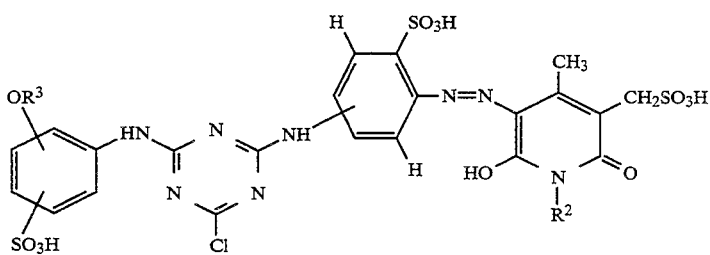

wherein
R[2]=H, CH$_3$ or C$_2$H$_5$ and
R[3]=C$_1$–C$_6$-alkyl.

5. Dyestuff according to claim 1, of the structure

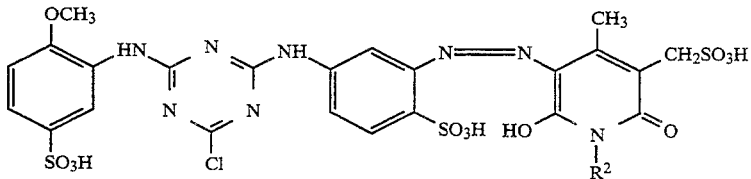

where
R[2]=H, CH$_3$ or C$_2$H$_5$.

6. Process for dyeing and printing naturally occurring and synthetic materials containing OH groups or amide groups, by applying thereto a dyestuff according to claim 1.

* * * * *